(12) United States Patent
Freijy

(10) Patent No.: US 7,201,437 B2
(45) Date of Patent: Apr. 10, 2007

(54) VEHICLE SEAT ASSEMBLY WITH BIASED HEADREST

(75) Inventor: Nizar Freijy, Oxford, MI (US)

(73) Assignee: Lear Corporation, Southfield, MI (US)

( * ) Notice: Subject to any disclaimer, the term of this patent is extended or adjusted under 35 U.S.C. 154(b) by 338 days.

(21) Appl. No.: 10/899,747

(22) Filed: Jul. 27, 2004

(65) Prior Publication Data

US 2006/0022498 A1 Feb. 2, 2006

(51) Int. Cl.
*A47C 1/02* (2006.01)
*B60N 2/00* (2006.01)

(52) U.S. Cl. .................. 297/61; 297/378.12; 297/336; 297/326

(58) Field of Classification Search .................. 297/61, 297/326, 378.12, 331, 335, 336
See application file for complete search history.

(56) References Cited

U.S. PATENT DOCUMENTS

| 3,603,642 | A | 9/1971 | Laessker | 297/408 |
|---|---|---|---|---|
| 3,655,241 | A | 4/1972 | Herzer et al. | 297/408 |
| 4,123,104 | A | 10/1978 | Andres et al. | 297/391 |
| 4,190,291 | A | 2/1980 | Korger | 297/408 |
| 4,191,422 | A | 3/1980 | Inasawa et al. | 297/391 |
| 4,600,240 | A | 7/1986 | Suman et al. | 297/408 |
| 4,657,304 | A | 4/1987 | Heesch et al. | 297/391 |
| 4,682,817 | A | 7/1987 | Freber | 297/408 |
| 4,685,737 | A | 8/1987 | Deley et al. | 297/408 |
| 4,762,367 | A | 8/1988 | Denton | 297/409 |
| 4,834,456 | A | 5/1989 | Barros et al. | 297/403 |
| 4,861,107 | A | 8/1989 | Vidwans et al. | 297/408 |
| 5,145,233 | A | 9/1992 | Nagashima | 297/408 |
| 5,199,765 | A | 4/1993 | Garmendia et al. | 297/391 |
| 5,498,051 | A * | 3/1996 | Sponsler et al. | 296/65.03 |
| 5,590,933 | A | 1/1997 | Andersson | 297/408 |
| 5,681,079 | A * | 10/1997 | Robinson | 297/61 |
| 6,000,760 | A | 12/1999 | Chung | 297/408 |
| 6,007,154 | A | 12/1999 | Parker et al. | 297/410 |
| 6,062,644 | A | 5/2000 | Lance | 297/410 |
| 6,074,011 | A | 6/2000 | Ptak et al. | 297/408 |
| 6,192,565 | B1 | 2/2001 | Tame | 29/61 |
| 6,471,296 | B2 | 10/2002 | Lance | 297/410 |
| 6,499,805 | B1 | 12/2002 | Watadani | 297/408 |
| 6,533,359 | B1 | 3/2003 | Holstensson | 297/391 |
| 6,631,954 | B2 * | 10/2003 | Amorin et al. | 297/378.1 |
| 6,705,658 | B2 | 3/2004 | Jach et al. | 296/65.09 |
| 6,719,373 | B2 | 4/2004 | Zimmermann | 297/410 |
| 6,902,232 | B2 * | 6/2005 | Kamrath et al. | 297/61 |
| 2001/0028191 | A1 | 10/2001 | Lance | 297/410 |
| 2002/0053826 | A1 | 5/2002 | Klink et al. | 297/410 |
| 2003/0006637 | A1 | 1/2003 | Jach et al. | 297/336 |
| 2003/0160481 | A1 | 8/2003 | Veine et al. | 297/216.12 |

* cited by examiner

*Primary Examiner*—Milton Nelson, Jr.
(74) *Attorney, Agent, or Firm*—Bill Panagos

(57) ABSTRACT

A vehicle seat assembly including a lower seat cushion supported by the vehicle and a seat back supported for movement between an upright position and a stowed position. The seat assembly also has a headrest supported for movement relative to the seat back. A locking mechanism engages the headrest to retain the headrest in a raised position when the seat back is in the upright position. The locking mechanism also disengages the headrest for allowing movement of the headrest away from the raised position when the seat back is moved toward the stowed position. The seat assembly also has a biasing mechanism that biases the headrest toward the raised position.

19 Claims, 4 Drawing Sheets

VEHICLE SEAT ASSEMBLY WITH BIASED HEADREST

BACKGROUND OF THE INVENTION

1. Field of the Invention

The present invention relates, generally, to vehicle seat assemblies and, more particularly, to a vehicle seat assembly with a biased headrest.

2. Description of the Related Art

Conventional vehicle seat assembly designs typically include a seatback assembly, a lower seat cushion, a recliner mechanism, a manual or power adjustment mechanism for adjusting the position of either the seat back or seat cushion, as well as a number of safety features including occupant restraint devices such as seatbelts. The vehicle seat assembly also typically includes a headrest mounted at the top or upper end of the seat back.

In the context of vehicle seating design, there is an ongoing effort to improve the safety of the vehicle occupant in the event of a collision. More specifically, there is an ongoing effort to provide safety mechanisms that reduce the chance of injury to the passenger's head and neck area. In the event of a rearward impact, the occupant is forced against the seat and can experience a very large energy pulse. In such circumstances, the pelvis and lumbar regions of the occupant generally exert more force, initially, on the seatback than do the thoracic or shoulder regions of the occupant. This initial load may cause a separation between the seatback and the thoracic, neck, and head regions of the occupant. Depending on the force of the rear impact, this separation can be quickly and violently closed by a following movement of the upper torso, neck, and head of the passenger toward the seatback in an event commonly known as "whiplash." The headrest of the seat assembly is designed to support the passenger's thoracic, neck, and head region during such an event to thereby reduce whiplash injuries.

There is also an ongoing effort to improve configurable interior seating systems that include seats that are moveable relative to the vehicle floor. For instance, in some seat assemblies conventionally referred to as "fold and tumble" seats, the seat back is moveable between an upright, generally vertical position, a first stowed position in which the seat back is folded into a generally horizontal position atop the lower seat cushion, and a second stowed position in which the seat back is moved with the seat cushion into a generally vertical position. These seat assemblies can be moved depending on the cargo or persons to be transported.

In some cases, the headrest limits the movement of the seat assembly because the headrest interferes with the vehicle floor or other surrounding structure. Thus, in partial response to this problem, headrests have been designed that are moveable in relation to the seat back. Once the headrest is moved, the headrest avoids interference with the vehicle floor or other surrounding structure, and the seat back can move over a larger range of motion.

While seat assemblies with movable headrests of the prior art have functioned adequately for their intended purposes, certain problems still remain. For instance, when the seat back is moved back from its stowed position to its upright position, the headrest remains out of position and must be manually raised into position for effectively supporting the occupant's thoracic, neck, and head region in the event of a vehicular collision. This can be an inconvenience for the occupant. Also, the occupant may forget to manually raise the headrest, and as such, the headrest is unable to properly support the occupant's thoracic, neck, and head region in the event of a vehicular collision. Therefore, there is an ongoing need for an improved seat assembly having a headrest that is moveable to avoid interference with other portions of the vehicle when stowed and that automatically moves into its raised position once the seat assembly is moved from its stowed position to its upright position such that the headrest can support the occupant's thoracic, neck, and head region.

SUMMARY OF THE INVENTION

The disadvantages of the related art are overcome in the vehicle seat assembly of the present invention including a lower seat cushion supported by the vehicle and a seat back supported for movement between an upright position and a stowed position. The seat assembly also has a headrest supported for movement relative to the seat back. Furthermore, the seat assembly includes a locking mechanism that engages the headrest to retain the headrest in a raised position when the seat back is in the upright position. The locking mechanism also disengages the headrest for allowing movement of the headrest away from the raised position when the seat back is moved toward the stowed position. The seat assembly also has a biasing mechanism that biases the headrest toward the raised position.

The headrest is automatically disengaged for movement relative to the seat back to thereby allow the seat back to move further when moving from an upright position to a stowed position. Also, the headrest automatically moves to and is engaged in the raised position when the seat back is moved from the stowed position to the upright position. The headrest does not need to be manually positioned like those of the prior art, and as such, the seat assembly is more convenient for the occupant and is more likely to properly support the occupant's thoracic, head, and neck region.

DETAILED DESCRIPTION OF THE PREFERRED EMBODIMENT(S)

Figure 1:
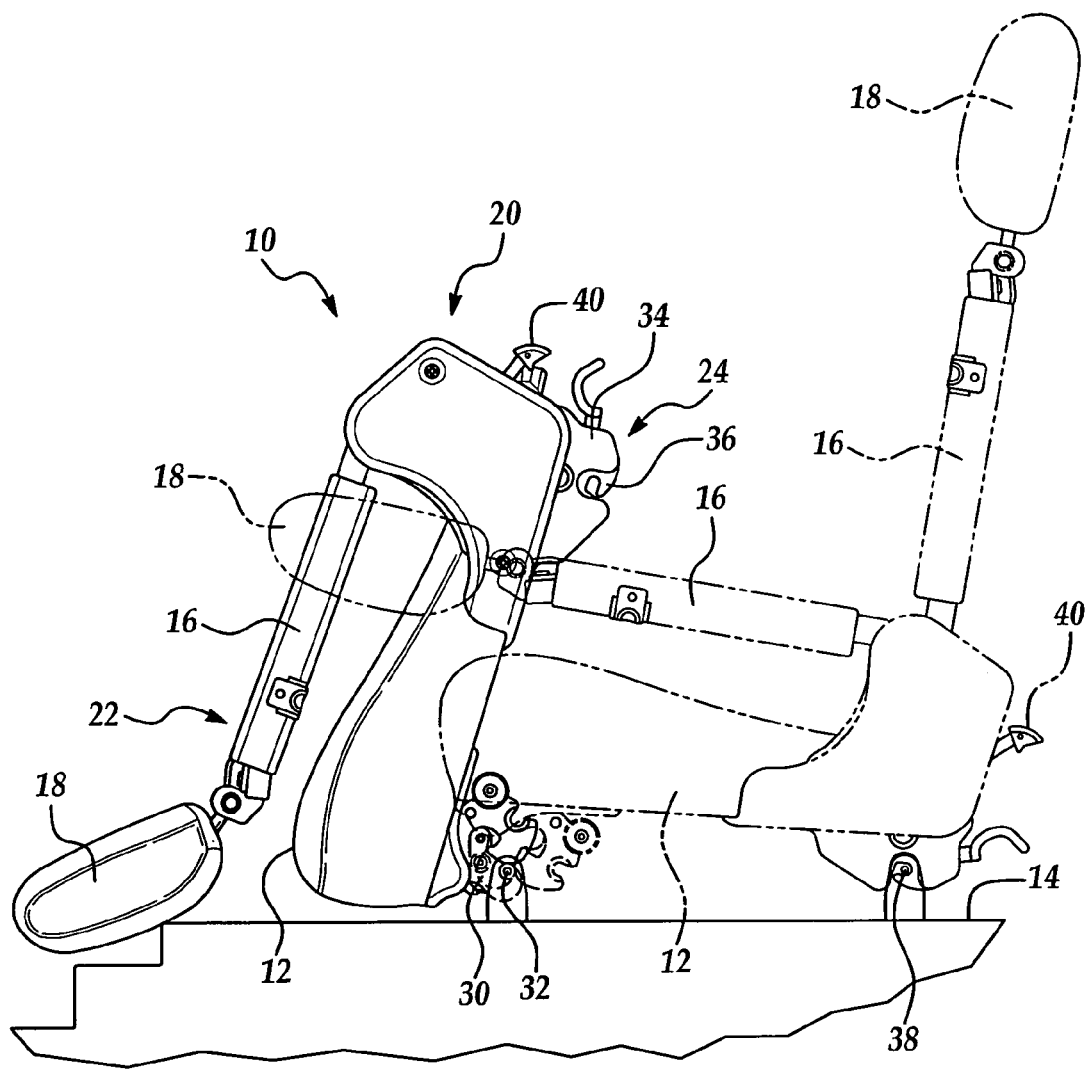
FIG. 1 is a side elevational view of a vehicle seat assembly of the present invention in its various positions.
Figure 2:
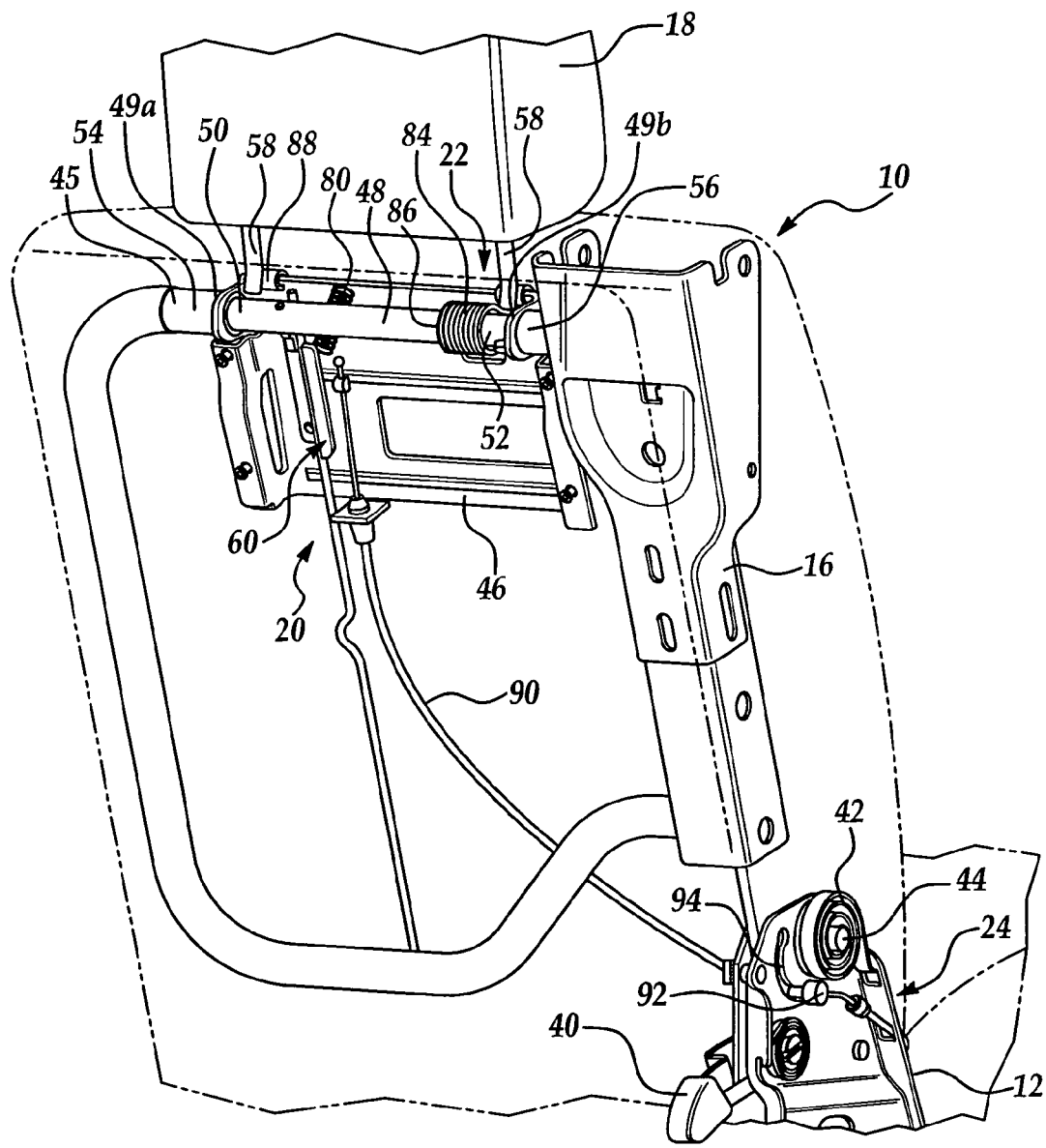
FIG. 2 is a rear perspective view of the vehicle seat assembly of the present invention.
Figure 4:
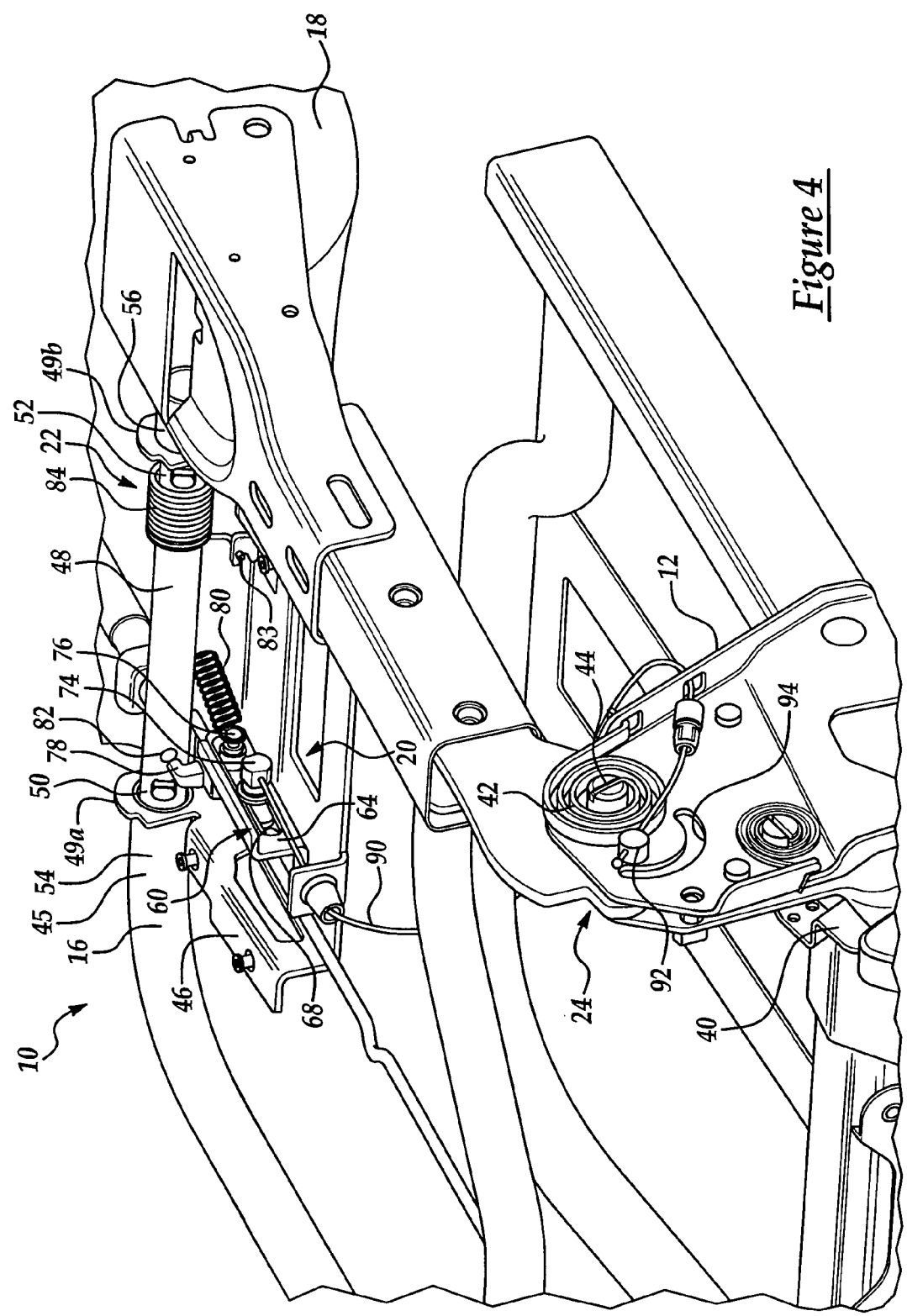
FIG. 4 is a rear perspective view of the vehicle seat assembly of the present invention illustrating the biasing mechanism, the locking mechanism, and the seat back in its stowed position.

Referring now to the drawings, where like numerals are used to designate like structure throughout the figures, a vehicle seat assembly of the present invention is generally indicated at 10. As shown, the vehicle seat assembly 10 includes a lower seat cushion 12. The seat cushion 12 can include a soft cushioning material such as foam, a rigid frame, and a covering made out of fabric, leather, or the like. For purposes of clarity, the covering of the seat cushion 12 is shown in FIG. 1, but only the frame of the seat cushion 12 is shown in FIGS. 2 and 4. The seat cushion 12 is operatively supported by a vehicle floor 14, which is tiered in the embodiment shown. Also, the seat cushion 12 is supported for movement relative to the vehicle floor 14 in a manner to be described in greater detail below. In the embodiment shown, the seat cushion 12 can be positioned in a generally horizontal position so as to support an occupant thereon, and the seat cushion 12 can be rotated upward from the vehicle floor 14 into a generally vertical position.

The seat assembly 10 also includes a seat back 16. Like the seat cushion 12, the seat back 16 can include a soft, cushioning material such as foam, a rigid frame, and a covering made out of fabric, leather, or the like. For purposes of clarity, however, only the frame of the seat back 16 is shown in FIGS. 1–4. The seat back 16 is supported for movement relative to the vehicle floor 14 between an upright position and a stowed position. In the upright position (shown in phantom lines in FIG. 1), the seat back 16 is generally vertical so as to support the back of an occupant seated in the vehicle seat assembly 10. The stowed position of the seat back 16 is defined herein as any position of the seat back 16 in which it is moved away from the upright position. For instance, in the embodiment shown, the seat back 16 can be positioned in a first stowed position (shown in phantom lines in FIG. 1) in which the seat back 16 is generally horizontal. In addition, the seat back 16 can also be positioned in a second stowed position (shown in solid lines in FIG. 1) in which the seat back 16 is generally upside down and vertical. A seat that can be positioned in this way is generally known in the art as a "fold and tumble" seat. However, those having ordinary skill in the art will appreciate from the description that follows that the present invention is not limited to a "fold and tumble" seat.

The vehicle seat assembly 10 also includes a headrest 18 mounted at the top end of the seat back 16. The headrest 18 can include a soft, cushioning material such as foam, a rigid frame, and a covering made out of fabric, leather, or the like. The headrest 18 is supported for rotational movement relative to the seat back 16 in a manner to be described. As shown in FIG. 1, when the seat back 16 is in the upright position, the headrest 18 is in a raised position (shown in phantom lines). The raised position of the headrest 18 is defined herein as any position in which the headrest 18 is generally aligned with the seat back 16. As best shown in FIG. 1, when the seat back 16 is moved toward the stowed position, the headrest 18 can rotate relative to the seat back 16 away from the raised position in a manner to be discussed in greater detail below.

The vehicle seat assembly 10 further includes a locking mechanism, generally indicated at 20, and a biasing mechanism, generally indicated at 22. As will be described in greater detail below, the locking mechanism 20 engages the headrest 18 to retain it in the raised position when the seat back 16 is in the upright position. The locking mechanism 20 also disengages the headrest 18 for allowing rotational movement of the headrest 18 away from the raised position when the seat back 16 is moved toward the stowed position. When the seat back 16 is moved from its upright position to its stowed position, the headrest 18 may contact the vehicle floor 14. However, the locking mechanism 20 allows the headrest 18 to move relative to the seat back 16, thereby avoiding interference between the headrest and the floor of the vehicle. As best shown in solid lines in FIG. 1, the seat back 16 can move over a larger range of motion as a result. Importantly, the biasing mechanism 22 biases the headrest 18 toward the raised position. Thus, when the seat back 16 is moved back toward its upright position and there is no surrounding structure interfering with the headrest 18, the headrest 18 automatically moves into the raised position for supporting the occupant's thoracic, neck and head region.

Referring now to FIGS. 1, 2, and 4, one means for configuring the seat assembly 10 is illustrated. In the embodiment shown, the vehicle seat assembly 10 includes a latch assembly, generally indicated at 24. The latch assembly 24 includes a front latch 30, which is mounted at the forward end of the frame of the seat cushion 12. The front latch 30 is also pivotally attached to a first pin 32 mounted atop the vehicle floor 14. The latch assembly 24 also includes a back latch 34, which is fixed at the rearward end of the frame of the seat cushion 12. The back latch 34 includes a catch 36 used for selectively attaching and detaching the back latch 34 to a striker 38 mounted atop the vehicle floor 14. The latch assembly 24 also includes a lever 40 extending from the rearward end of the seat cushion 12. When the seat back 16 is in the upright position, the lever 40 abuts against and engages with the lower end of the frame of the seat back 16 for retaining the seat back 16 in the upright position. By rotating the lever 40 upwards, the lever 40 disengages the seat back 16 and allows for movement of the seat back 16 to the first stowed position in which the seat back 16 is generally horizontal and folded atop the seat cushion 12. Further rotation of the lever 40 moves the catch 36 of the back latch 34 to thereby disengage the back latch 34 from the striker 38. The seat cushion 12 and seat back 16 can then be pivoted together about the first pin 32 such that the seat cushion 12 and seat back 16 are moved to the forward "tumbled" position in which they are generally vertical.

The vehicle seat assembly 10 can include a seat back biasing member 42, shown in detail in FIGS. 2 and 4, to bias the seat back 16 toward the first stowed position. In the embodiment shown, the frame of the seat back 16 includes a plurality of pivot pins 44, one of which is shown in FIGS. 2 and 4. The pivot pins 44 are pivotally attached to the frame of the seat cushion 12. As best shown in FIG. 4, the seat back biasing member 42 can be a torsion spring attached at one end to the pivot pin 44 and at the opposite end to the frame of the seat cushion 12. As such, when the lever 40 disengages the seat back 16, the biasing member 42 automatically moves the seat back 16 from the upright position to the first stowed position.

By moving the seat cushion 12 and seat back 16, the vehicle interior can be configured in a number of ways. With the seat cushion 12 in the horizontal position and the seat back 16 in the upright position, the seat assembly 10 can support an occupant. With the seat cushion 12 in the horizontal position and the seat back 16 in the first stowed position (i.e., with the seat assembly 10 in the "folded" position), the seat assembly 10 expands the available cargo space within the vehicle. With the seat cushion 12 in the vertical position and the seat back 16 in the second stowed position (i.e., with the seat assembly 10 in the "tumbled" position), the seat assembly 10 allows ingress and egress of a vehicle passenger into and out of the vehicle. Those having ordinary skill in the art will recognize, however, that the scope of the present invention is not limited by the type or means of movement of the seat cushion 12 and/or seat back 16. For instance, in another embodiment not shown, the seat cushion 12 is not directly attached to the seat back 16 such that the seat cushion 12 can be moved from the horizontal position to the vertical position independent of the seat back 16, and then the seat back 16 can move from the upright position to the first stowed position. This is generally known in the art as a "flip and fold" seat and would fall within the scope of the present invention.

Figure 3:
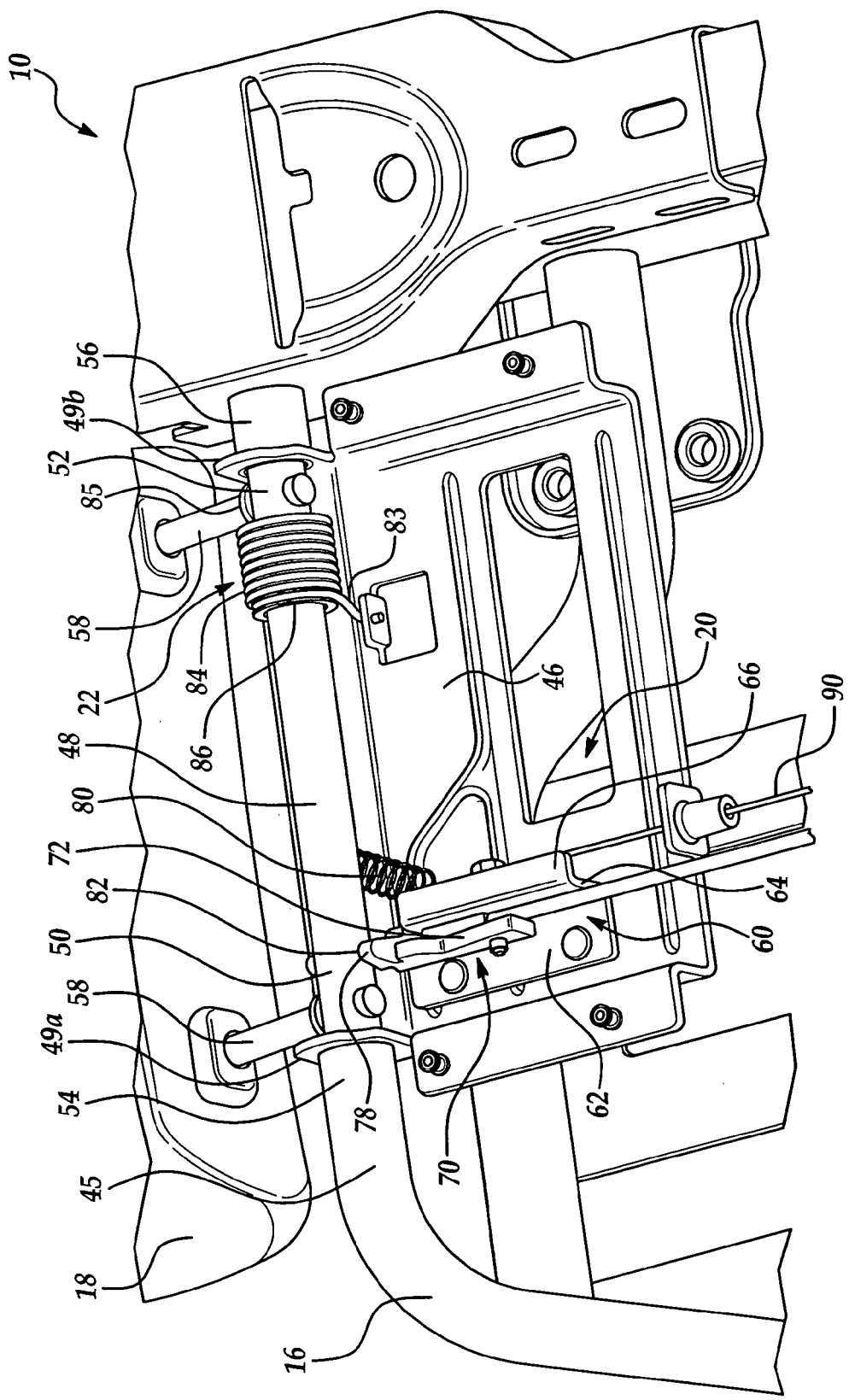
FIG. 3 is an enlarged rear perspective view of the vehicle seat assembly of the present invention illustrating the seat back and biasing mechanism.

As shown in FIGS. 2–4, the locking mechanism 20 includes a mounting plate 46 mounted to the frame of the seat back 16. For instance, in the embodiment shown, the frame of the seat back 16 includes a segmented cross bar 45 near the top of the seat back 16 that defines a first end 54 and a second end 56. The mounting plate 46 includes a plurality of flanges 49a, 49b, one of which is mounted to the first end 54 and one of which is mounted to the second end 56 by welding or otherwise. The locking mechanism 20 also includes a pivoting tube 48. The pivoting tube 48 is substantially straight with a first terminal end 50 and a second terminal end 52. The first terminal end 50 of the pivoting tube 48 is rotatably attached to the flange 49a of the mounting plate 46 by bushings, bearings or the like, and the second terminal end 52 of the pivoting tube 48 is rotatably attached to the flange 49b of the mounting plate 46 in the same manner. The headrest 18 includes a plurality of posts 58 extending from the underside of the headrest 18 and transversely through the pivoting tube 48. The posts 58 are fixed to the pivoting tube 48. As such, the pivoting tube rotatably couples the headrest 18 to the seat back 16.

The locking mechanism 20 also includes a guide bracket, generally indicated at 60. The guide bracket 60 is generally Z-shaped so as to define a mounting flange 62, a guide body 64, and a top flange 66. The mounting flange 62 of the guide bracket 60 is fixed to the mounting plate 46 by rivets or otherwise such that the guide body 64 extends perpendicularly from the mounting plate 46. Also, a slot 68 is formed within the guide body 64 of the guide bracket 60.

Furthermore, the locking mechanism 20 includes a sliding member, generally indicated at 70 in FIG. 3. As shown in FIGS. 3 & 4, the sliding member 70 includes a main body 72 with attached first and second posts 74, 76, each extending transversely from the main body 72 of the sliding member 70. The first and second posts 76 extend transversely through the slot 68 of the guide bracket 60 such that the sliding member 70 can slidably move in relation to the guide bracket 60. The sliding member 70 also includes a pin 78 formed at a top end thereof, and when the sliding member 70 slides in relation to the guide bracket 60, the pin 78 moves toward and away from the pivoting tube 48.

The locking mechanism 20 also includes a biasing member 80. In the embodiment shown, the biasing member 80 is a coiled spring attached at one end to the mounting plate 46 and at the opposite end to the second post 76 of the sliding member 70. As such, the biasing member 80 biases the pin 78 of the sliding member 70 toward the pivoting tube 48.

As best shown in FIG. 4, an aperture 82 is formed in the pivoting tube 48 and extends transversely therethrough. The aperture 82 is located so as to align with the pin 78 when the headrest 18 is in the raised position and to be misaligned with the pin 78 when the headrest 18 is moved away from the raised position. As such, the pin 78 is operable to move in and out of the aperture to thereby engage and disengage the headrest 18. More specifically, when the headrest 18 is in the upright position, the aperture 82 of the pivoting tube 48 is aligned with the pin 78, and the biasing member 80 biases the pin 78 into the aperture 82, thereby inhibiting rotation of the headrest 18 away from the raised position. As will be described in greater detail below, movement of the seat back 16 toward the stowed position causes the pin 78 to move out of the aperture 82 against the biasing force of the biasing member 80, thereby allowing rotation of the headrest 18 away from the raised position.

As noted above, the seat assembly 10 includes a biasing mechanism 22. The biasing mechanism 22 includes a biasing member 84. In the embodiment shown, the biasing member 84 includes a torsion spring disposed about the pivoting tube 48 with a first end 83 attached to the mounting plate 46, as best shown in FIG. 3. A second end 85 of the biasing member 84 abuts against one of the posts 58 extending from the headrest 18. The biasing mechanism 22 also includes a collar 86 disposed between the pivoting tube 48 and the biasing member 84 to thereby allow the pivoting tube 48 to rotate within the biasing member 84.

As best shown in FIG. 2, the biasing mechanism 22 includes at least one stop 88 attached to an upper edge of the mounting plate 46. The biasing member 84 biases the post 58 of the headrest 18 toward the raised position, and the posts 58 abut against the stops 88 such that the stops 88 limit the movement of the headrest 18 in the raised position. Preferably, the aperture 82 is aligned with the pin 78 when the posts 58 abut against the stops 88.

The locking mechanism 20 further includes an actuating member 90. As shown in FIGS. 2–3, the actuating member 90 can be a cable operatively coupling the pin 78 and the seat back 16 such that the cable moves the pin 78 out of the aperture 82 when the seat back 16 is moved from the upright position toward the stowed position. As shown in FIGS. 2 & 4, the frame of the seat back 16 includes a post 92, and the frame of the seat cushion 12 includes a slot 94 with a curved axis. The seat back 16 and seat cushion 12 are coupled such that the post 92 can slide within the slot 94. When the seat back 16 is in the upright position (FIG. 2), the post 92 is positioned within the lower end of the slot 94, and when the seat back 16 is in the stowed position (FIG. 4), the post 92 is positioned within the upper end of the slot 94. One end of the actuating member 90 extends transversely through the post 92, and the opposite end of the actuating member 90 extends transversely through the first post 74 of the sliding member 70.

Thus, when the seat back 16 is moved from the upright position to the stowed position, the corresponding movement of the post 92 within the slot 94 causes the actuating member 90 to pull the sliding member 70 against the force of the biasing member 80 such that the pin 78 moves out of the aperture 82. The headrest 18 is thus disengaged from the locking mechanism 20 and can be moved away from the raised position against the biasing force of the biasing member 84. Thus, in the embodiment shown in FIG. 1, the headrest 16 can pivot toward the rear of the seat back 16 once the headrest 16 abuts against the vehicle floor 14.

When the seat back 16 is moved from the stowed position to the upright position, the corresponding movement of the post 92 within the slot 94 provides enough slack to the actuating member 90 such that the biasing member 80 pulls the sliding member 70 toward the pivoting tube 48. The biasing member 84 biases the headrest 18 against the stops 88, and once the aperture 82 of the pivoting tube 48 is aligned with the pin 78, the biasing member 80 pulls the pin 78 into the aperture 82 to thereby engage and lock the headrest 18 in the raised position. Thus, when the seat back 16 is moved to the upright position, the headrest 18 is automatically returned to the raised position for proper support of the occupant's thoracic, neck and head region.

Those having ordinary skill in the art will recognize the headrest 18 in the embodiment shown does not move in relation to the seat back 16 when the pin 78 has moved out of the aperture 82. This is because the biasing member 84 remains biasing the headrest 18 against the stops 88. It is only when an external force pushes the headrest against the biasing force of the biasing member 84 that the headrest 18 moves away from the raised position. For instance, as shown in FIG. 1, when the seat back 16 is in the first stowed position, the headrest 18 remains in the raised position.

However, when the seat back 16 moves to the second stowed position, the headrest 18 abuts against the vehicle floor 14, which in turn moves the headrest 18 away from the raised position. Those having ordinary skill in the art will recognize, however, that the headrest 18 could be designed to move away from the raised position at any point in which the seat back 16 is moved away from the upright position without departing from the scope of the invention.

In summary, the headrest 18 can be automatically disengaged for movement relative to the seat back 16 to thereby allow the seat back 16 to move further when moving from an upright position to a stowed position. Also, the headrest 18 automatically moves to and is engaged in the raised position when the seat back 16 is moved from the stowed position to the upright position. The headrest 18 does not need to be manually positioned like those of the prior art, and as such, the seat assembly 10 is more convenient for the occupant and is more likely to properly support the occupant's thoracic, head, and neck region.

The present invention has been described in an illustrative manner. It is to be understood that the terminology used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A vehicle seat assembly for use with a vehicle comprising:
   a lower seat cushion;
   a seat back supported for movement between an upright position and a stowed position;
   a headrest supported for movement relative to said seat back;
   a locking mechanism including a pivot tube having an aperture and a pin, said pivot tube rotatably coupling said head rest to said seat back, said pin being operable to move into said aperture to engage and retain said headrest in a raised position when said seat back is in the upright position, and to move out of said aperture so as to disengage said headrest for allowing movement of said headrest away from the raised position when said seat back is moved toward the stowed position; and
   a biasing mechanism that biases said headrest toward the raised position.

2. A vehicle seat assembly as set forth in claim 1, further comprising a seat back biasing member that biases said seat back toward the stowed position.

3. A vehicle seat assembly as set forth in claim 1, wherein said locking mechanism includes an actuating member that moves said pin out of said aperture to thereby disengage said locking mechanism from said headrest when said seat back is moved toward the stowed position.

4. A vehicle seat assembly as set forth in claim 3, wherein said actuating member is a cable operatively coupling said pin and said seat back such that said cable moves said pin out of said aperture when said seat back is moved toward the stowed position.

5. A vehicle seat assembly as set forth in claim 4, wherein said seat cushion includes a slot with a curved axis, and said seat back includes a post that slides within said slot when said seat back moves between the upright position and the stowed position, said cable operatively coupling said pin and said post.

6. A vehicle seat assembly as set forth in claim 1, wherein said locking mechanism further includes a biasing member that biases said pin toward said aperture.

7. A vehicle seat assembly as set forth in claim 1, wherein said locking mechanism further includes a guide bracket having a slot, and said locking mechanism also includes a sliding member with a post and said pin formed thereon, said post of said locking mechanism extending through said slot such that said sliding member slidably moves in relation to said guide bracket.

8. A vehicle seat assembly as set forth in claim 1, wherein said biasing mechanism includes at least one stop operable to limit the movement of said headrest toward the raised position.

9. A vehicle seat assembly as set forth in claim 1, wherein said headrest is supported for rotational movement relative to said seat back.

10. A vehicle seat assembly as set forth in claim 1, wherein said biasing mechanism includes a torsion spring that biases said headrest toward the raised position.

11. A vehicle seat assembly as set forth in claim 1, wherein said seat back is supported for movement between an upright position, a first stowed position in which said seat back is generally horizontal, and a second stowed position in which said seat back is generally vertical.

12. A vehicle seat assembly as set forth in claim 1, wherein said seat cushion is supported for movement relative to the vehicle.

13. A vehicle seat assembly for use with a vehicle comprising:
    a lower seat cushion;
    a seat back supported for movement between an upright position and a stowed position;
    a headrest;
    a pivot tube with an aperture, said pivot tube rotatably coupling said headrest to said seat back so as to pivotally support said headrest for movement relative to said seat back;
    a locking mechanism with a pin operable to move into said aperture to retain said headrest in a raised position when said seat back is in the upright position and that moves out of said aperture for allowing movement of said headrest away from the raised position when said seat back is moved toward the stowed position; and
    a biasing mechanism that biases said headrest toward the raised position, said biasing mechanism including at least one stop operable to limit the movement of said headrest toward the raised position.

14. A vehicle seat assembly as set forth in claim 13, wherein said seat cushion is supported for movement relative to the vehicle.

15. A vehicle seat assembly as set forth in claim 13, wherein said locking mechanism includes an actuating member that moves said pin out of said aperture to, thereby, disengage said locking mechanism from said headrest when said seat back is moved toward the stowed position.

16. A vehicle seat assembly as set forth in claim 15, wherein said actuating member is a cable operatively coupling said pin and said seat back such that said cable moves said pin out of said aperture when said seat back is moved toward the stowed position.

17. A vehicle seat assembly as set forth in claim 16, wherein said seat cushion includes a slot with a curved axis, and said seat back includes a post that slides within said slot when said seat back moves between the upright position and the stowed position, said cable operatively coupling said pin and said post.

18. A vehicle seat assembly as set forth in claim 13, wherein said locking mechanism further includes a biasing member that biases said pin toward said aperture.

19. A vehicle seat assembly as set forth in claim 13, wherein said locking mechanism further includes a guide bracket having a slot, and said locking mechanism also includes a sliding member with a post and said pin formed thereon, said post of said locking mechanism extending through said slot such that said sliding member slidably moves in relation to said guide bracket.

* * * * *